Jan. 1, 1946.  D. R. PIATT ET AL  2,392,260
TORQUE MEASURING INSTRUMENT
Filed Dec. 22, 1944

INVENTORS
Donald R. Piatt
Charles S. Jackoski
BY
W. M. Wilson
ATTORNEY

Patented Jan. 1, 1946

2,392,260

UNITED STATES PATENT OFFICE 2,392,260

TORQUE MEASURING INSTRUMENT

Donald R. Piatt and Charles S. Jackoski, Endicott, N. Y., assignors to International Business Machines Corporation, New York, N. Y., a corporation of New York Application December 22, 1944, Serial No. 569,290

3 Claims. (Cl. 73—134)

This invention relates to torque measuring instruments.

The general object of the invention is to provide a simple instrument to be held and applied by one hand to a rotatable work piece to measure its torque.

The object is, further, to provide such an instrument which upon application to the work piece will measure its torque while rotated in either of opposite directions.

The object is, still further, to provide such an instrument with variably resistant counterbalancing means which in a single position of application of the instrument to a rotatable work piece will variably resist clockwise or counterclockwise torque of a rotatable work piece.

The object is, moreover, to provide a simple hand tool including torque counterbalancing and measuring means which may be applied to a rotatable work piece to rotate the work piece and measure the torque required to effect such rotation.

Other objects of the invention will be pointed out in the following description and claims and illustrated in the accompanying drawing, which discloses, by way of example, the principle of the invention and the best mode, which has been contemplated, of applying that principle.

The instrument comprises a casing 10 having a round head 10a open at one side and integrally joining at the opposite side with a neck 10b of smaller diameter. The head 10a is small enough to be held in one hand and its periphery is knurled to assist the operator in grasping it firmly.

Figure 4:
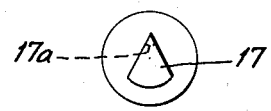
Fig. 4 is a detail view of one of the bearing elements for a spring counterbalance contained in the instrument.

A shaft 11 is journaled by ball bearings 12 in the neck 10b. The shaft 11 projects into the interior of the casing head 10a and there has fixed to it a collar 13. The collar 13 is formed at diametrically opposite sides with pairs of spaced ears 14. Between each pair of ears 14 is fixed a bearing stud 15. There are thus two studs 15 at diametrically opposite sides of the shaft 11 and in fixed relation to the shaft. Fixed to the side of the casing head 10a are two diametrically opposite knife edge bearing elements 17. Fig. 4 shows the element 17 on an enlarged scale. It includes a knife edge with a very small notch 17a. A pair of torque counterbalancing coil springs 18 are connected between the studs 15 and the knife edge elements 17. Each spring has one end seated in the notch 17a of an element 17 and its other edge hooked around the stud 15 located at the same side of the shaft 11 as the element 17. The two springs are thus located at opposite sides of the shaft 11. The knife edge seat for each spring provides a fine bearing point of support for the spring which does not change as the spring is angularly moved. Such angular movement may occur upon turning of the casing 10 with respect to shaft 11 or upon turning of the shaft with respect to the casing. When there is no tendency for the casing and shaft 11 to turn relatively to each other, the springs 18 keep them in a relative central, zero, or normal position.

Riveted to the left end of the member 13 is a dial 20 marked on its outside face with four scales A, B, C, and D. Scales A and C are diametrically opposite and inverted with respect to each other. Scales B and D are in similar relationship to each other. Each scale includes graduations and associated numbers for indicating ounce-inches of torque. The left edge of the casing head 10a is inscribed at diametrically opposite locations with index lines 21 and 22. Index line 21 coacts with scales A and B, while index line 22 coacts with scales C and D. In the normal or zero position of the instrument, the index lines 21 and 22 are centrally located between the pairs of coacting scales.

Upon turning of the casing 10 relative to shaft 11 or upon turning of the shaft relative to the casing, the distance between each knife edge bearing 17 and adjacent stud 15 increases, whereby the spring 18 connected between the bearing and stud is stretched. The angle of the spring also changes with respect to the knife edge element, but since the knife edge element has a substantially single bearing point of engagement with one end of the spring, there is no change in position of this end of the spring with respect to the casing. Therefore, the relationships between the turning of the casing relative to the shaft 11 or vice versa and the stretching of the springs are in definite proportion, permitting exact calibration of the scales A, B, C, and D. As the angle through which the casing is turned relative to the shaft or vice versa increases, the springs are stretched to a proportionally increasing degree to increase their resistance to the turning movement. The springs resist such turning movement in either clockwise or counterclockwise direction. Upon clockwise movement of the shaft 11 while the casing 10 is held stationary, the scales A and C will move into coaction with the index lines 21 and 22, respectively. These two scales may be marked with plus signs to conveniently indicate that they are adapted to measure clockwise rotational torque on the shaft 11. Upon counterclockwise rotation of the shaft 11 with respect to casing 10, the two scales B and D come into coaction with the index lines. These scales are marked with minus signs to indicate that they are adapted to measure counterclockwise rotational torque on the shaft. Two adjacent scales A and B or C and D would be sufficient but it is preferred to provide all four in order that readings may be made with equal facility while the instrument is held in any chance position.

Figure 1:
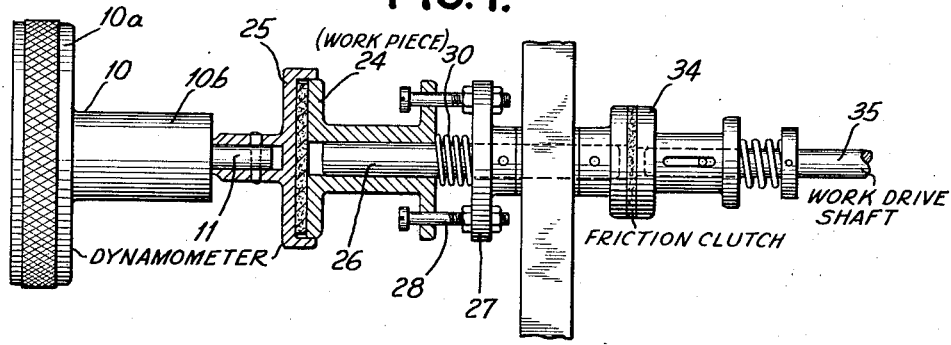
Fig. 1 is a view of the instrument applied to a rotating work piece adapted to be rotated by a friction clutch.
Figure 2:
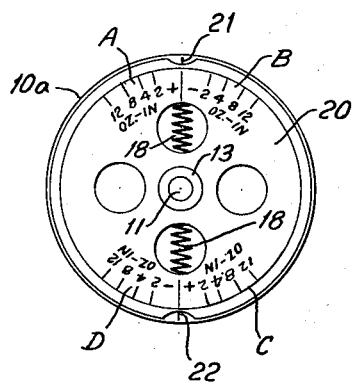
Fig. 2 is a face view of the instrument.
Figure 3:
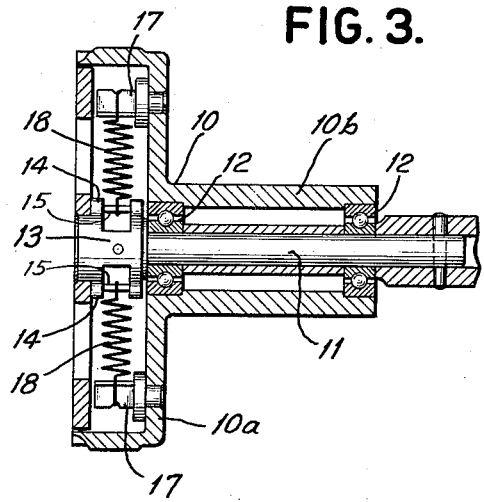
Fig. 3 is a section, on an enlarged scale, through the instrument.

The right hand end portion of shaft 11 extends past the end of the neck 10b of the casing 10 of the torque measuring instrument. Fig. 1 shows the application of this instrument to a work piece 24. To adapt the instrument to the desired work, a suitable adapter is fixed to the shaft 11 where it extends outside the casing. For the work shown in Fig. 1, an adapter 25 is used. The adapter has a cupped flange the face of which is adapted to engage with the friction clutch facing of work piece 24 and the rim of which is adapted to surround the work piece to center the instrument relative to the work. The work piece 24 is mounted on a work shaft 26 for movement along the shaft but for rotation with the shaft. To provide for rotation of the work piece 24 with the shaft 26, a collar 27 fixed to the shaft carries a plurality of pins 28 which slidably pass through holes in the rear flange of the work piece. A coil spring 30 between the work piece 24 and the collar 27 urges the work piece to the left. Shaft 26, as shown, is adapted to be driven by a friction clutch 34 carried by a drive shaft 35.

To apply the instrument to the work, the operator holds casing head 10a in one hand and fits the flange of adapter 25 to the work piece 24. The entire instrument is pushed towards the work piece so that the face of the flange of adapter 25 presses firmly against the friction clutch face of work piece 24. The work piece 24 is adapted to move back as the instrument is pressed against it, until the spring 30 is compressed sufficiently to resist further movement of the work piece along shaft 26. Assume the shaft 26 is being rotated by drive shaft 35. The operator grasps the casing head 10a firmly to hold the casing stationary. The work piece frictionally turns the adapter 25 and the shaft 11 relative to the casing, thereby stretching the springs 18 to increase their resistance to turning of the shaft 11. The instrument may be constructed for any suitable range of torque measurements. As shown, it has a measuring range of 12 oz.-in. If the drive torque of work piece 24 is within this range, the springs 18 will stall the shaft 11, adapter 25, work piece 24 and work shaft 26 when they have been turned through an angle corresponding to the torque. The torque will be given at this point by scale A or C in coaction with index lines 21 and 22 if the shaft 26 was driven clockwise and by scale B or D in coaction with the index lines if the shaft 26 was driven counterclockwise.

The instrument also may be used to measure the friction torque of clutch 34 on work shaft 26 while drive shaft 35 is held stationary. The instrument will be applied, for this purpose, in the same manner as before, but instead of holding the casing stationary, it will be turned by the operator. At the point at which the shaft 11 starts to turn, the friction of clutch 34 has been overcome by the force of springs 18 and the friction torque is indicated by the proper scales on the instrument.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A torque measuring instrument small and light enough to be carried by hand and adapted to be aplied by hand to a rotatable work piece to measure the torque thereon, comprising a small casing element adapted to be gripped in the hand, a shaft element journaled in the casing element and provided with means to engage the work piece and couple it to the shaft, variably resistant torque counterbalance means inside the casing element and connected to the shaft element for normally maintaining the shaft and casing elements in relative zero position and resisting the turning of the elements relative to each other away from zero position with force increasing with the angle through which the elements are displaced relatively away from the zero position, and torque indicating means comprising a chart bearing a scale of torque indications carried by one of said elements and a coacting index provided on the other element, said shaft element being fixedly provided with a collar carrying a pair of pins at diametrically opposite sides of the shaft element, a pair of anchor members secured to the casing and located at diametrically opposite sides of the shaft element, and said variably resistant torque counterbalancing means comprising a pair of coil springs, each attached at one end to one of the pins and at the opposite end to the anchor member at the same side of the shaft as the pin, whereby the springs extend in alinement and to opposite sides of the shaft element to normally maintain the shaft element in zero position relative to the casing element and whereby each spring is stretched upon turning of the shaft element in either direction relative to the casing element.

2. A torque measuring instrument small and light enough to be carried by hand and adapted to be applied by hand to a rotatable work piece to measure the torque thereon, comprising a small casing element adapted to be gripped in the hand, a shaft element journaled in the casing element and provided with means to engage the work piece and couple it to the shaft, variably resistant torque counterbalance means inside the casing element and connected to the shaft element for normally maintaining the shaft and casing elements in relative zero position and resisting the turning of the elements relative to each other away from zero position with force increasing with the angle through which the elements are displaced relatively away from the zero position, and torque indicating means comprising a chart bearing a scale of torque indications carried by one of said elements and a coacting index provided on the other element, said variably resistant torque counterbalancing means comprising a spring connected at one end to the shaft element and at the other end to the casing element to be stretched in proportion to the angle of relative displacement between the elements in either clockwise or counterclockwise direction from their relative zero position, and said chart bearing two scales of torque indications at opposite sides of said index while the elements are in zero relative position, one of said scales coacting with the index upon turning of the elements relatively to each other in one direction and the other scale coacting with the index upon turning of the elements relatively to each other in the reverse direction.

3. A torque measuring instrument comprising a casing element, a shaft element journaled in the casing element and provided with means to engage the work piece and couple it to the shaft, variably resistant torque counterbalance means inside the casing element and connected to the shaft element for normally maintaining the shaft and casing elements in relative zero position and resisting the turning of the elements relative to each other away from zero position with force increasing with the angle through which the elements are displaced relatively away from the zero position, and torque indicating means comprising a chart bearing a scale of torque indications carried by one of said elements and a coacting index provided on the other element, said casing element including a round drum-like head open at one side and a neck of smaller diameter extending integrally from the opposite side of the head, anti-friction bearing means inside the neck for journaling the shaft element, said shaft element extending past the neck to carry the means for coupling it to the rotating work piece, said shaft element also extending into the interior of the head to be connected to the variably resistant counterbalance means, and said chart of the indicating means comprising a round dial fixed to the shaft where it extends into the head and of a diameter smaller than the diameter of the inside periphery of the head so as to be able to rotate inside the head.

DONALD R. PIATT.
CHARLES S. JACKOSKI.